US008966253B1

(12) United States Patent
Trimberger (10) Patent No.: US 8,966,253 B1
(45) Date of Patent: Feb. 24, 2015

(54) METHOD AND APPARATUS FOR AUTHENTICATING A PROGRAMMABLE DEVICE BITSTREAM

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 464 days.

(21) Appl. No.: 12/791,668

(22) Filed: Jun. 1, 2010

(51) Int. Cl.
*H04L 29/06* (2006.01)
*G06F 9/30* (2006.01)

(52) U.S. Cl.
CPC .......... *H04L 63/123* (2013.01); *G06F 9/30145* (2013.01)
USPC ............. 713/168; 713/189; 713/191; 726/26; 714/30

(58) Field of Classification Search
CPC .............. H04L 63/123; H04L 29/0653; G06F 9/30018; G06F 9/30145; H03M 13/09
USPC ................. 713/168, 189, 191; 726/26; 714/30
See application file for complete search history.

(56) References Cited

U.S. PATENT DOCUMENTS

| | | | |
|---|---|---|---|
| 5,406,627 A | | 4/1995 | Thompson et al. |
| 5,457,408 A | * | 10/1995 | Leung .............................. 326/38 |
| 5,598,424 A | | 1/1997 | Erickson et al. |
| 5,668,947 A | | 9/1997 | Batcher |
| 5,802,003 A | * | 9/1998 | Iadanza et al. ........... 365/230.03 |
| 5,892,961 A | * | 4/1999 | Trimberger ...................... 712/10 |
| 6,105,105 A | * | 8/2000 | Trimberger ................... 711/103 |
| 6,181,164 B1 | | 1/2001 | Miller |
| 6,188,766 B1 | | 2/2001 | Kocher |
| 6,191,614 B1 | * | 2/2001 | Schultz et al. .................. 326/41 |
| 6,278,783 B1 | | 8/2001 | Kocher et al. |
| 6,298,442 B1 | | 10/2001 | Kocher et al. |
| 6,304,658 B1 | | 10/2001 | Kocher et al. |
| 6,327,661 B1 | | 12/2001 | Kocher et al. |
| 6,381,699 B2 | | 4/2002 | Kocher et al. |

(Continued)

OTHER PUBLICATIONS

Hori, Yohei; Satoh, Akashi; Sakane, Hirofumi; Toda, Kenji;, "Bitstream Encryption and Authentication Using AES-GCM in Dynamically Reconfigurable Systems", Advances in Information and Computer Security, Lecture Notes in Computer Science, 2008, Springer Berlin / Heidelberg, 978-3-540-89597-8, pp. 261-278, vol. 5312.*

(Continued)

*Primary Examiner* — Syed Zaidi
(74) *Attorney, Agent, or Firm* — Robert M. Brush; LeRoy D. Maunu (57) ABSTRACT

A method and apparatus for authenticating a bitstream used to configure programmable devices are described. In an example, the bitstream is received via a configuration port of the programmable device, the bitstream including instructions for programming configuration registers of the programmable device and at least one embedded message authentication code (MAC). At least a portion of the instructions is initially stored in a memory of the programmable device without programming the configuration registers. At least one actual MAC is computed based on the bitstream using a hash algorithm. The at least one actual MAC is compared with the at least one embedded MAC, respectively. Each instruction stored in the memory is executed to program the configuration registers until any one of the at least one actual MAC is not the same as a corresponding one of the at least one embedded MAC, after which any remaining instructions in the memory are not executed.

14 Claims, 7 Drawing Sheets

(56) References Cited

U.S. PATENT DOCUMENTS

| | | | |
|---|---|---|---|
| 6,429,682 | B1 | 8/2002 | Schultz et al. |
| 6,510,518 | B1 | 1/2003 | Jaffe et al. |
| 6,539,092 | B1 | 3/2003 | Kocher |
| 6,640,305 | B2 | 10/2003 | Kocher et al. |
| 6,654,884 | B2 | 11/2003 | Jaffe et al. |
| 6,654,889 | B1 * | 11/2003 | Trimberger .................... 713/191 |
| 6,731,536 | B1 | 5/2004 | McClain et al. |
| 6,839,774 | B1 * | 1/2005 | Ahn et al. ......................... 710/14 |
| 6,894,527 | B1 * | 5/2005 | Donlin et al. ...................... 326/8 |
| 6,978,370 | B1 | 12/2005 | Kocher |
| 7,039,816 | B2 | 5/2006 | Kocher et al. |
| 7,064,577 | B1 * | 6/2006 | Lee ................................. 326/38 |
| 7,162,644 | B1 * | 1/2007 | Trimberger .................... 713/189 |
| 7,200,235 | B1 | 4/2007 | Trimberger |
| 7,254,800 | B1 * | 8/2007 | Trimberger .................... 716/117 |
| 7,373,668 | B1 * | 5/2008 | Trimberger ...................... 726/26 |
| 7,401,258 | B1 * | 7/2008 | Fang et al. ........................ 714/30 |
| 7,506,165 | B2 | 3/2009 | Kocher et al. |
| 7,535,249 | B1 * | 5/2009 | Knapp ............................... 326/8 |
| 7,539,926 | B1 | 5/2009 | Lesea |
| 7,546,441 | B1 * | 6/2009 | Ansari et al. .................. 712/220 |
| 7,587,044 | B2 | 9/2009 | Kocher et al. |
| 7,599,488 | B2 | 10/2009 | Kocher et al. |
| 7,606,362 | B1 * | 10/2009 | Streicher et al. ................ 380/29 |
| 7,634,083 | B2 | 12/2009 | Kocher et al. |
| 7,668,310 | B2 | 2/2010 | Kocher et al. |
| 7,681,233 | B1 * | 3/2010 | Fox et al. ........................... 726/9 |
| 7,787,620 | B2 | 8/2010 | Kocher et al. |
| 7,792,287 | B2 | 9/2010 | Kocher et al. |
| 7,966,534 | B1 * | 6/2011 | Jacobson ...................... 714/725 |
| 7,984,292 | B1 * | 7/2011 | Streicher et al. .............. 713/160 |
| 2001/0002486 | A1 | 5/2001 | Kocher et al. |
| 2001/0015919 | A1 * | 8/2001 | Kean ............................. 365/200 |
| 2001/0025337 | A1 | 9/2001 | Worrell et al. |
| 2001/0037458 | A1 | 11/2001 | Kean |
| 2001/0053220 | A1 | 12/2001 | Kocher et al. |
| 2002/0099948 | A1 | 7/2002 | Kocher et al. |
| 2003/0028771 | A1 | 2/2003 | Kocher et al. |
| 2004/0162989 | A1 | 8/2004 | Kirovski |
| 2006/0136723 | A1 * | 6/2006 | Taylor ........................... 713/168 |
| 2007/0033419 | A1 | 2/2007 | Kocher et al. |
| 2007/0038984 | A1 | 2/2007 | Gschwind et al. |
| 2008/0037781 | A1 | 2/2008 | Kocher et al. |
| 2008/0049935 | A1 | 2/2008 | Kocher et al. |
| 2008/0101604 | A1 | 5/2008 | Kocher et al. |
| 2008/0130886 | A1 | 6/2008 | Kocher et al. |
| 2008/0133938 | A1 | 6/2008 | Kocher et al. |
| 2008/0137848 | A1 | 6/2008 | Kocher et al. |
| 2008/0279369 | A1 | 11/2008 | Palmer |
| 2010/0205461 | A1 | 8/2010 | Satou et al. |
| 2010/0287359 | A1 | 11/2010 | Norden |
| 2011/0320855 | A1 | 12/2011 | Ambroladze et al. |

OTHER PUBLICATIONS

Badrignans, B.; Elbaz, R.; Torres, L.; , "Secure FPGA configuration architecture preventing system downgrade," Field Programmable Logic and Applications, 2008. FPL 2008. International Conference on , vol., No., pp. 317-322, Sep. 8-10, 2008.*

Drimer, Saar; "Authentication of FPGA Bitstreams: Why and How," Reconfigurable Computing: Architectures, Tools and Applications, Lecture Notes in Computer Science, 2007, Springer Berlin / Heidelberg, vol. 4419, pp. 73-84.*

Trimberger, S.; , "Trusted Design in FPGAs," Design Automation Conference, 2007. DAC '07. 44th ACM/IEEE, vol., No., pp. 5-8, Jun. 4-8, 2007.*

T.M. Galla et al., "Control Flow Monitoring for a Time-Triggered Communication Controller," 10th European Workshop on Dependable Computing (EWDC-10), Schriftenreihe der Osterreichischen Computer Gesellschaft,Vienna, 1999. pp. 43-48.*

Fong, R.J.; Harper, S.J.; Athanas, P.M.; , "A versatile framework for FPGA field updates: an application of partial self-reconfiguration," Rapid Systems Prototyping, 2003. Proceedings. 14th IEEE International Workshop on , vol., No., pp. 117-123, Jun. 9-11, 2003.*

Xilinx, Inc., Virtex-6 FPGA Configuration User Guide UG360 (v3. 0), Jan. 18, 2010, pp. 1-174, in particular pp. 94-98 and pp. 103-166, available from Xilinx, Inc., San Jose, California, USA.

U.S. Appl. No. 12/791,608, filed Jun. 1, 2010, Bridgford et al.

Specification and drawings for U.S. Appl. No. 13/077,814, filed Mar. 31, 2011, Trimberger.

Xilinx, *Virtex-5 FPGA Configuration User Guide*, UG191 (v3.9.1), Aug. 20, 2010, Chapter 6, pp. 1-166, Xilinx, Inc., San Jose, California, USA.

Xilinx, *Virtex-6 FPGA Configuration*, UG360 v3.2, Nov. 1, 2010, pp. 1-180, Xilinx, Inc., San Jose, California, USA.

* cited by examiner

METHOD AND APPARATUS FOR AUTHENTICATING A PROGRAMMABLE DEVICE BITSTREAM

FIELD OF THE INVENTION

One or more aspects of the present invention relate generally to programmable integrated circuit devices and, more particularly, to a method and apparatus for authenticating a bitstream used to configure such programmable devices.

BACKGROUND

Programmable logic devices (PLDs) exist as a well-known type of programmable integrated circuit (IC) device ("programmable device") that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. An FPGA may also include various dedicated logic circuits, such as memories, microprocessors, digital clock managers (DCMs), and input/output (I/O) transceivers.

Programmable devices, such as FPGAs, can include decryption circuitry on-chip in order to process bitstreams that have been encrypted to provide design security. Without knowledge of the appropriate encryption key, it is difficult to analyze a bitstream in order to understand or clone the design. As a further security measure, programmable devices may include authentication logic that can be used to detect whether an encrypted bitstream (or any bitstream) has been altered.

Notably, a bitstream may include various fields that generally contain both configuration data and instructions for modifying registers in the configuration logic of the programmable device. The instructions may include setting the configuration rate, setting a startup sequence, and the like. Configuration logic in a programmable device may include various registers that implement command and control of the configuration process, where the values of such registers can be set using the instructions in the bitstream. One current bitstream authentication mechanism involves authenticating the bitstream before the device is activated, but after the instructions have been executed. That is, the instructions in the bitstream take effect as soon as they are encountered by the configuration logic. As a result, an attacker can tamper with the instructions in the bitstream in an attempt to defeat the authentication and encryption mechanisms and gain access to the design.

Accordingly, there exists a need in the art for a method and apparatus for authenticating a bitstream used to configure programmable devices that overcomes the aforementioned deficiencies.

SUMMARY

A method of authenticating a bitstream coupled to a programmable device to configure the programmable device is described. The method can include: receiving the bitstream via a configuration port of the programmable device, the bitstream including instructions for programming configuration registers of the programmable device and at least one embedded message authentication code (MAC); initially storing at least a portion of the instructions in a memory of the programmable device without programming the configuration registers; computing, at the programmable device, at least one actual MAC based on the bitstream using a hash algorithm; comparing the at least one actual MAC with the at least one embedded MAC, respectively; and executing each instruction stored in the memory to program the configuration registers until any one of the at least one actual MAC is not the same as a corresponding one of the at least one embedded MAC, after which any remaining instructions in the memory are not executed.

In an embodiment, the at least one embedded MAC can include a single embedded MAC computed with respect to all of the instructions. The at least a portion of the instructions stored in the memory can comprise all of the instructions.

In an embodiment, the instructions can include delay-sensitive instructions and delay-insensitive instructions. The at least a portion of the instructions stored in the memory can include only the delay-insensitive instructions. The method can further include executing each delay-sensitive instruction as such instruction is received in the bitstream at the programmable device.

In an embodiment, the instructions can include head instructions and tail instructions. The bitstream can include configuration data between the head instructions and the tail instructions. The at least one embedded MAC can include a first MAC for the head instructions and a second MAC for a combination of the configuration data and the tail instructions.

In an embodiment, the bitstream includes at least one decrypt word count (DWC) that indicates a number of words respectively associated with the at least one embedded MAC. In an embodiment, the method can include decrypting at least a portion of the bitstream upon receipt from the configuration port. In an embodiment, the at least a portion of the bitstream is decrypted using a shared symmetric key.

Also disclosed is another method of authenticating a bitstream coupled to a programmable device to configure the programmable device. The method can include: receiving the bitstream via a configuration port of the programmable device, the bitstream including instructions for programming configuration registers of the programmable device and configuration data; performing at least one consistency check on the bitstream periodically; executing each of the instructions as received in the bitstream to program the configuration registers until any one of the at least one consistency check fails, after which any remaining instructions in the bitstream are not executed.

In an embodiment, performing the at least one consistency check can include: analyzing each of the instructions as received in the bitstream to detect an ill-formed instruction by comparing each instruction against a plurality of valid instructions; and indicating consistency check failure if any one of the instructions is detected as an ill-formed instruction.

In an embodiment, each of the instructions can include a corresponding checksum. Performing the consistency check(s) can include: processing the checksum for each of the instructions; and indicating consistency check failure if the checksum of any one of the instructions fails.

In an embodiment, the bitstream can include a plurality of checksums occurring periodically throughout. Performing the consistency check(s) can include: initializing a timer that counts down towards zero to a predefined value; validating each checksum as each of the plurality of checksums is received; re-initializing the timer to the predefined value after each valid checksum; and indicating consistency check failure if the timer reaches zero.

In an embodiment, the bitstream can include a message authentication code (MAC) computed with respect to all of the instructions in the bitstream.

An apparatus for authenticating a bitstream coupled to a programmable device to configure the programmable device can include: a memory a controller coupled to the memory, and an authenticator coupled to the controller. The controller can be configured to: (1) receive the bitstream via a configuration port of the programmable device, the bitstream including instructions for programming configuration registers of the programmable device and at least one embedded message authentication code (MAC); and (2) initially store at least a portion of the instructions in a memory of the programmable device without programming the configuration registers. The authenticator can be configured to: (1) compute, at the programmable device, at least one actual MAC based on the bitstream using a hash algorithm; and (2) compare the at least one actual MAC with the at least one embedded MAC, respectively. The controller can provide each instruction stored in the memory for execution to program the configuration registers until any one of the at least one actual MAC is not the same as a corresponding one of the at least one embedded MAC, after which any remaining instructions in the memory are not provided for execution.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION

Figure 1:
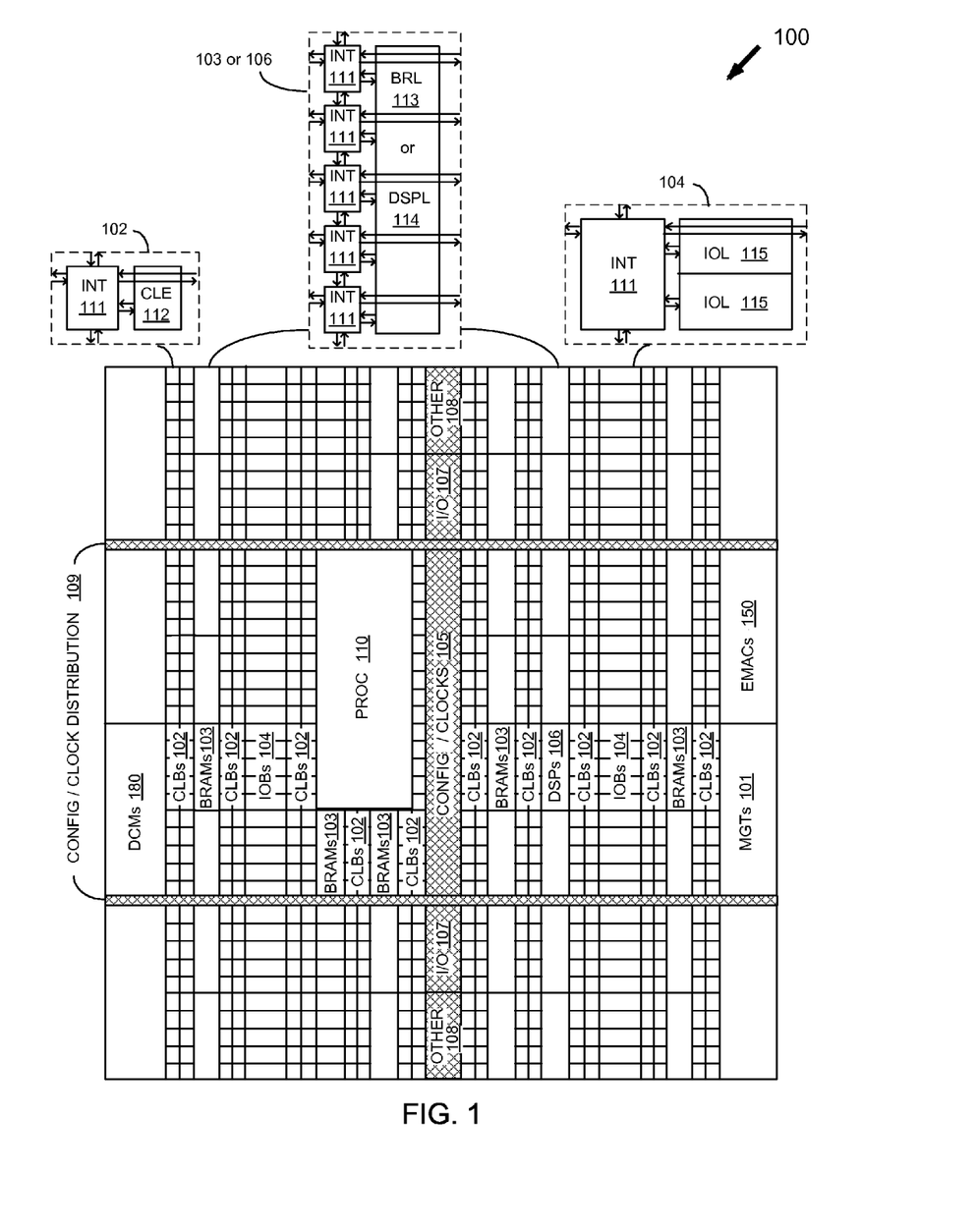
FIG. 1 illustrates an exemplary architecture for a programmable logic plane of an FPGA.

FIG. 1 illustrates an exemplary architecture for a programmable logic plane 100 of an FPGA. The FPGA of FIG. 1 can be used to implement certain embodiments of the invention. However, the invention is not limited to implementations using FPGAs, but can be applied to other programmable devices as well. The FPGA of FIG. 1 merely provides an exemplary device to which the invention can be applied.

The architecture 100 includes a large number of different programmable tiles including multi-gigabit transceivers (MGTs 101), configurable logic blocks (CLBs 102), random access memory blocks (BRAMs 103), input/output blocks (IOBs 104), configuration logic 116, clocking logic 117, digital signal processing blocks (DSPs 106), specialized input/output blocks (I/O 107) (e.g., configuration ports and clock ports), and other programmable blocks 108, such as digital clock managers, analog-to-digital converters, system monitoring logic, and so forth. The layout of the physical structures implementing the programmable logic plane 100 on the IC may be the same or similar to the layout of the logical architecture shown in FIG. 1.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1. The programmable tiles and corresponding programmable interconnect structure are generally referred to as "programmable logic."

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

The FPGA architecture 100 may also include one or more dedicated processor blocks (PROC 110). The processor block 110 comprises a microprocessor core, as well as associated control logic. The processor block 110 is coupled to the programmable logic of the FPGA in a well known manner.

In the pictured embodiment, a columnar area near the center of the die (shown hatched in FIG. 1) is used for configuration/clocking logic 105, the I/O logic 107, and the other control logic 108. Horizontal areas 109 extending from this column are used to distribute global clocks and configuration signals across the breadth of the FPGA. The configuration/clocking logic 105 provides an interface to, and loads configuration data to, a configuration memory (not shown).

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations as well as the location of the blocks within the array included at the top of FIG. 1 are purely exemplary. For example, in an actual FPGA more than one adjacent column of CLBs is typically included wherever the CLBs appear, to facilitate the efficient implementation of user logic.

Figure 2:
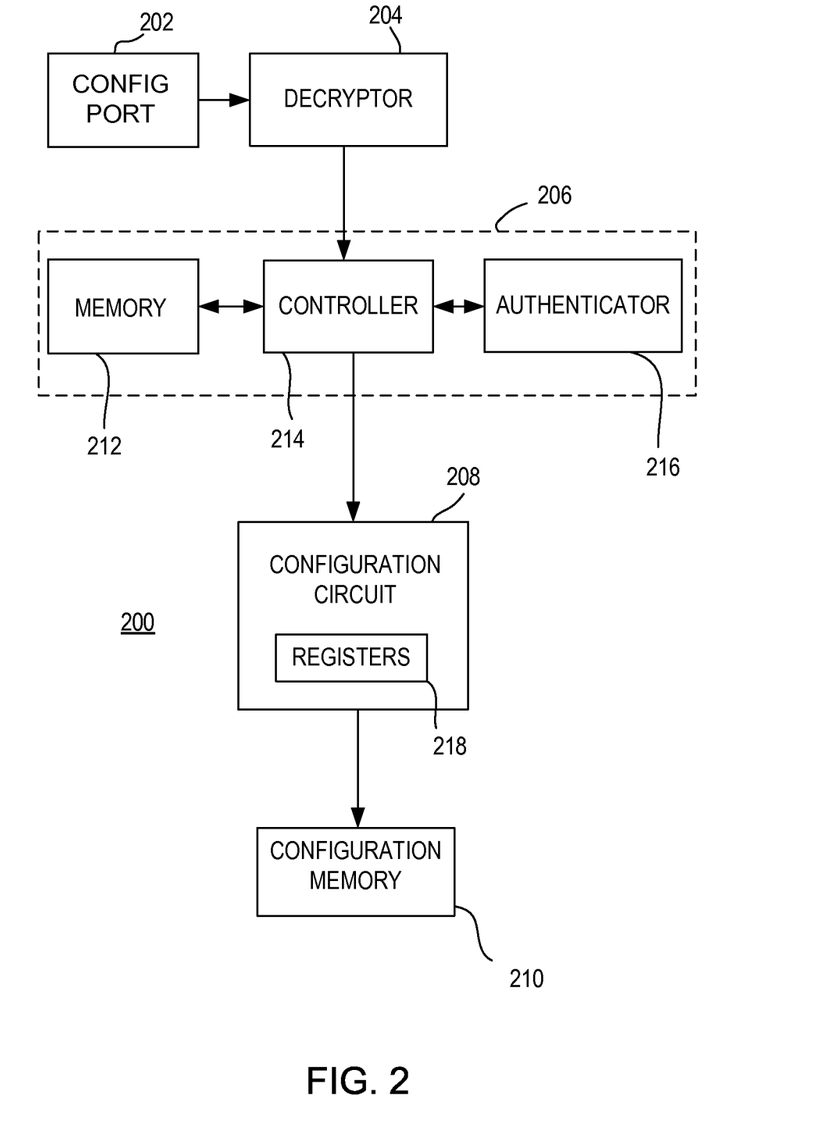
FIG. 2 is a block diagram depicting a configuration logic plane of a programmable device.

FIG. 2 is a block diagram depicting a configuration logic plane 200 of a programmable device. The configuration logic plane 200 may be used in the configuration/clocking logic 109 of the FPGA 100 described above. The configuration logic plane 200 includes a configuration port 202, a decryptor 204, authentication circuitry 206, a configuration circuit 208, and configuration memory 210. The authentication circuitry 206 includes a memory 212, a controller 214, and an authenticator 216.

The configuration port 202 is configured to receive a bitstream for controlling the configuration circuit 208 to program the configuration memory 210. Storage locations in the configuration memory 210 control the programmable logic of the programmable device (e.g., CLBs, IOBs, etc.). The bitstream generally includes configuration data to be stored in the configuration memory 210, and instructions for execution by the configuration circuit 208 to facilitate storage of the configuration data in the configuration memory 210. The instructions may load particular values into registers 218 of the configuration circuit 208 in order to control operation of the configuration process.

Figure 3:
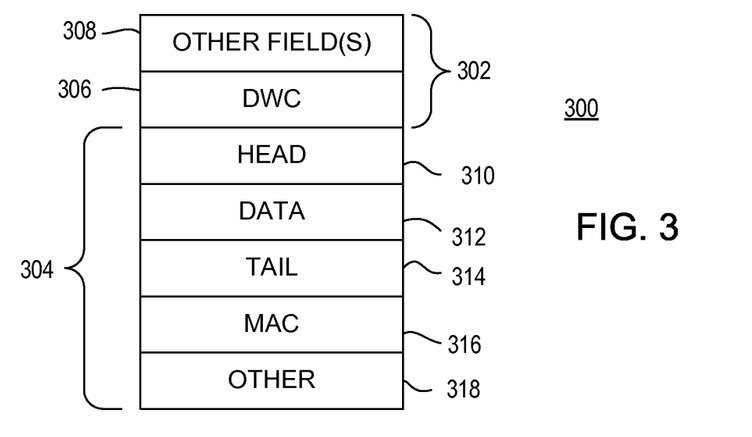
FIG. 3 is a block diagram depicting a first exemplary structure of a bitstream.

FIG. 3 is a block diagram depicting an exemplary structure 300 of a bitstream. The structure 300 includes a header portion 302 and a data portion 304. The header portion 302 can be plain text (i.e., not encrypted), and the data portion 304 can be cipher text (i.e., encrypted). The header portion 302 includes a decrypted word count (DWC) field 306 and other control fields 308 (e.g., a synchronization field for alignment, a mask field for storing a mask value, and the like). The DWC field 306 includes a value indicative of the number of words included in a message authentication code (MAC) calculation, described below.

The data portion 304 includes a header instruction field 310, a configuration data field 312, a tail instruction field 314, a MAC field 316, and other fields 318. The header instruction field 310 includes instruction(s) for reading and/or writing one or more of the registers 218 in the configuration circuit 208 prior to loading configuration data into the configuration memory 210. The configuration data field 312 includes the actual configuration data to be loaded into the configuration memory 210. The tail instruction field 314 includes instruction(s) for reading and/or writing one or more of the registers 218 in the configuration circuit 208 after the configuration data has been loaded into the configuration memory 210. The MAC field 316 can include a MAC code produced by a hash algorithm for a particular number of words proceeding the MAC field 316 as indicated by the DWC field 306. For example, the MAC code may be a keyed-hash MAC (HMAC) code produced using a SHA-256 algorithm, although other kinds of hash algorithms can be used. The MAC code in the MAC field 316 is referred to herein as the "embedded MAC", to distinguish from the MAC code produced as the bitstream is processed by the authentication logic 206. The other fields 318 can include various gaps, no-operations, padding, dummy, and the like type fields. It is to be understood that the arrangement of the other fields 318 in the structure 300 of FIG. 3 is not meant to connote a particular order in the bitstream, but rather illustrates a logical division of data in the bitstream. Thus, the fields in the other fields 318 may occur in different positions in the bitstream, such as between the tail instruction and MAC fields 314 and 316.

Referring to FIGS. 2 and 3, the decryptor 204 receives the bitstream from the configuration port 202. The decryptor 204 executes a decryption algorithm to decrypt the encrypted portion of the bitstream. For example, a symmetric key encryption algorithm may be employed to encrypt the bitstream, and the encryption key provided to the decryptor 204 for decrypting the bitstream. Any known encryption/decryption algorithms can be employed, such as AES encryption/decryption. Decryption can be optional. If decryption is used, the authentication circuitry 206 receives the decrypted bitstream from the decryptor 204. The authentication circuitry 206 may instead use secure key storage or other secure mechanism to receive and hold the embedded MAC. In this case, the authentication circuitry 206 authenticates the data portion 304 that has been transmitted in plain text.

In some embodiments, the authentication circuitry 206 authenticates the bitstream by executing a hash algorithm and comparing the result to embedded MAC code(s) in the bitstream. Various embodiments of the authentication process are described below. The authentication circuitry 206 provides the bitstream to the configuration circuit 208. The configuration circuit 208 loads the configuration data into the configuration memory 210 based on the instructions that program the registers 218. If the authentication circuitry 206 determines that the bitstream is not authentic (i.e., has be altered), then the authentication circuitry 206 can signal a configuration error and stop all or a portion of the configuration process performed by the configuration circuit 208 and decryptor 204.

Exemplary embodiments relate to preventing an attacker from tampering with the bitstream instructions in order to obviate the encryption and authentication mechanisms and gain unauthorized access to the bitstream data. In one embodiment, all of the instructions in the bitstream are stored in memory prior to being sent to the configuration circuit 208. Once the full bitstream has been loaded and authenticated, then the instructions are read from the memory and executed by the configuration circuit 208.

Notably, the controller 214 can store each instruction in the bitstream in the memory 212. The configuration data can be loaded into the configuration memory 210. Once the entire bitstream has been read, the authenticator 216 executes the authentication algorithm (e.g., on the data portion 304) to obtain an actual MAC. The authenticator 216 compares the actual MAC with the embedded MAC to determine if the bitstream is authentic. If so, the controller 214 provides the instructions from the memory 212 to the configuration circuit 208 and the configuration process is allowed to finish. If the bitstream is not authentic, the controller 214 stops the configuration process and the instructions are not provided to the configuration circuit 208 for execution. Thus, instructions in a bitstream having unauthorized alterations are never executed.

In some cases, the instructions in the bitstream may include one or more instructions that must be executed as the configuration data is loaded to the configuration memory 210. For example, an instruction to change or set the configuration clock frequency may need to be executed by the configuration circuit 208 prior loading the configuration data into the configuration memory 210. Such instructions are referred to herein as "delay-sensitive" instructions, since execution of such instructions cannot be delayed.

Figure 4:
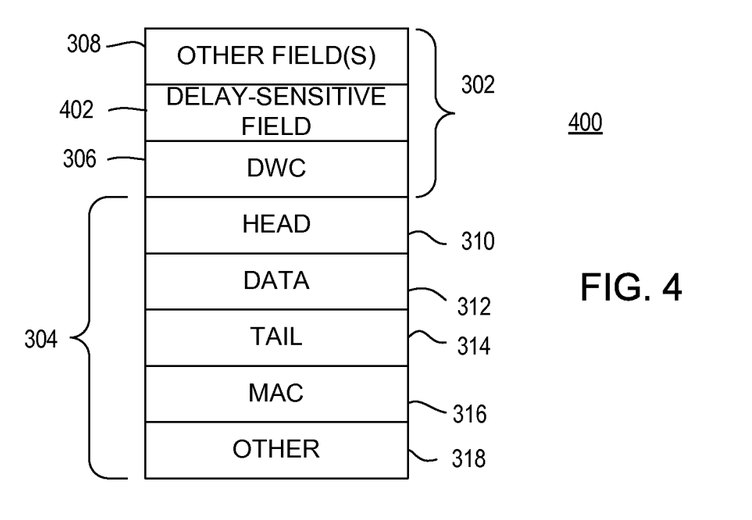
FIG. 4 is a block diagram depicting a second exemplary structure of a bitstream.

Thus, in another embodiment, the controller 214 only stores in the memory 212 those instructions that are not delay-sensitive. The delay-sensitive instructions are forwarded to the configuration circuit 208 as they are received in the bitstream. In this embodiment, the delay-sensitive instructions may be moved outside the encrypted portion of the bitstream (i.e., in the plain text portion of the bitstream before the DWC field). FIG. 4 shows a block diagram depicting an exemplary structure 400 of a bitstream. Elements in FIG. 4 that are the same or similar to those of FIG. 3 are designated with identical reference numerals and described in detail above. In the structure 400, a delay-sensitive instruction field 402 is included before the DWC field 306. The delay-sensitive instruction field 402 may include one or more delay-sensitive instructions that are not to be cached in the memory 212, as noted above.

In the embodiments above, a single MAC code is embedded in the bitstream and is used to authenticate the entire bitstream. In another embodiment, the bitstream may be configured with multiple MAC code fields each having a MAC code for a different portion of the bitstream. In general, the configuration plane 200 reads instructions from the bitstream, authenticates the portion of the bitstream read so far, executes the instructions if authentic, reads additional instructions, and then repeats.

Figure 5:
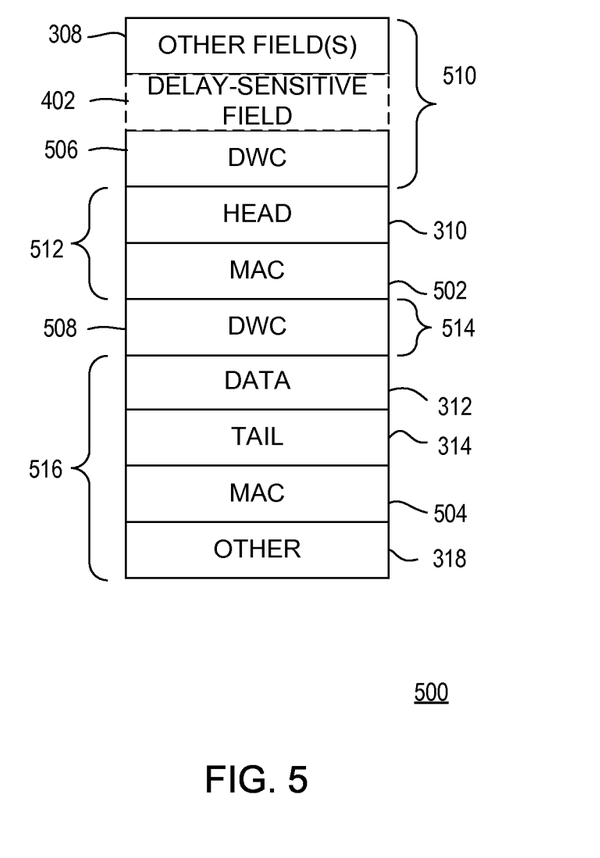
FIG. 5 is a block diagram depicting a third exemplary structure of a bitstream.

FIG. 5 shows a block diagram depicting an exemplary structure 500 of a bitstream. Elements in FIG. 5 that are the same or similar to those of FIG. 3 are designated with identical reference numerals and described in detail above. The structure 500 includes a MAC field 502 for the head instruction field 310, and a MAC field 504 for the data field and tail instruction field 312 and 314. Accordingly, the structure includes a DWC field 506 corresponding to the MAC field 502, and a DWC field 508 corresponding to the MAC field 504. The MAC field 502 includes a MAC code computed based on the instruction(s) in the head instruction field 310, where the number of words in the head instruction field 310 is indicated in the DWC field 506. The MAC field 504 includes a MAC code computed based on the configuration data and the instructions in the data and tail instruction fields 312 and 314, where the number of words in the fields 312 and 314 is indicated in the DWC field 508. The structure includes a section 510 of the other fields 308 and the DWC 506, a section 512 of the head and MAC fields 310 and 502, a section 514 of the DWC 508, and a section 516 of the data, tail, MAC, and other fields 312, 314, 504, and 318. In the structure 500, sections 510 and 514 are plain text, and sections 512 and 516 are encrypted.

If header instruction field 310 does not fit in memory 212, the field 310 may be split into smaller pieces, each including a portion of the header instruction field and an embedded MAC for that portion. A separate DWC may be included with each smaller piece of the field 310. Thus, section 512 may be repeated any number of times. In particular, the memory 212 may be sized to only contain one instruction. Alternatively, the memory 212 may be sized to contain one decrypted block of data (e.g., 128 bits for AES).

Returning to FIG. 2, assume the bitstream is formatted according to the structure 500 of FIG. 5. The controller 214 stores the head instructions in the memory 212 as each instruction is received. The controller 214 then provides the MAC code in the MAC field 502 to the authenticator 216, which authenticates the head instructions stored in the memory 212. If authentic, the controller 214 then forwards the head instructions to the configuration circuit 208 for execution. In the meantime, the controller 214 passes the configuration data to the configuration circuit 208 and stores the tail instructions in the memory 212. The controller 214 then provides the MAC received in the MAC field 504 to the authenticator 216, which authenticates the configuration data and the tail instructions. If authentic, the controller 214 then forwards the tail instructions to the configuration circuit 208 for execution.

In the embodiment above, two MAC codes were embedded in the bitstream. It is to be understood that more than two MAC codes can be embedded in the bitstream for different fields or combinations of fields. Further, the structure 500 in FIG. 5 can be modified to include delay-sensitive instructions outside of the encrypted portion of the bitstream, similar to the structure 400 of FIG. 4. The controller 214 forwards the delay-insensitive instructions to the configuration circuit 208 for immediate execution, as described above.

Figure 6:
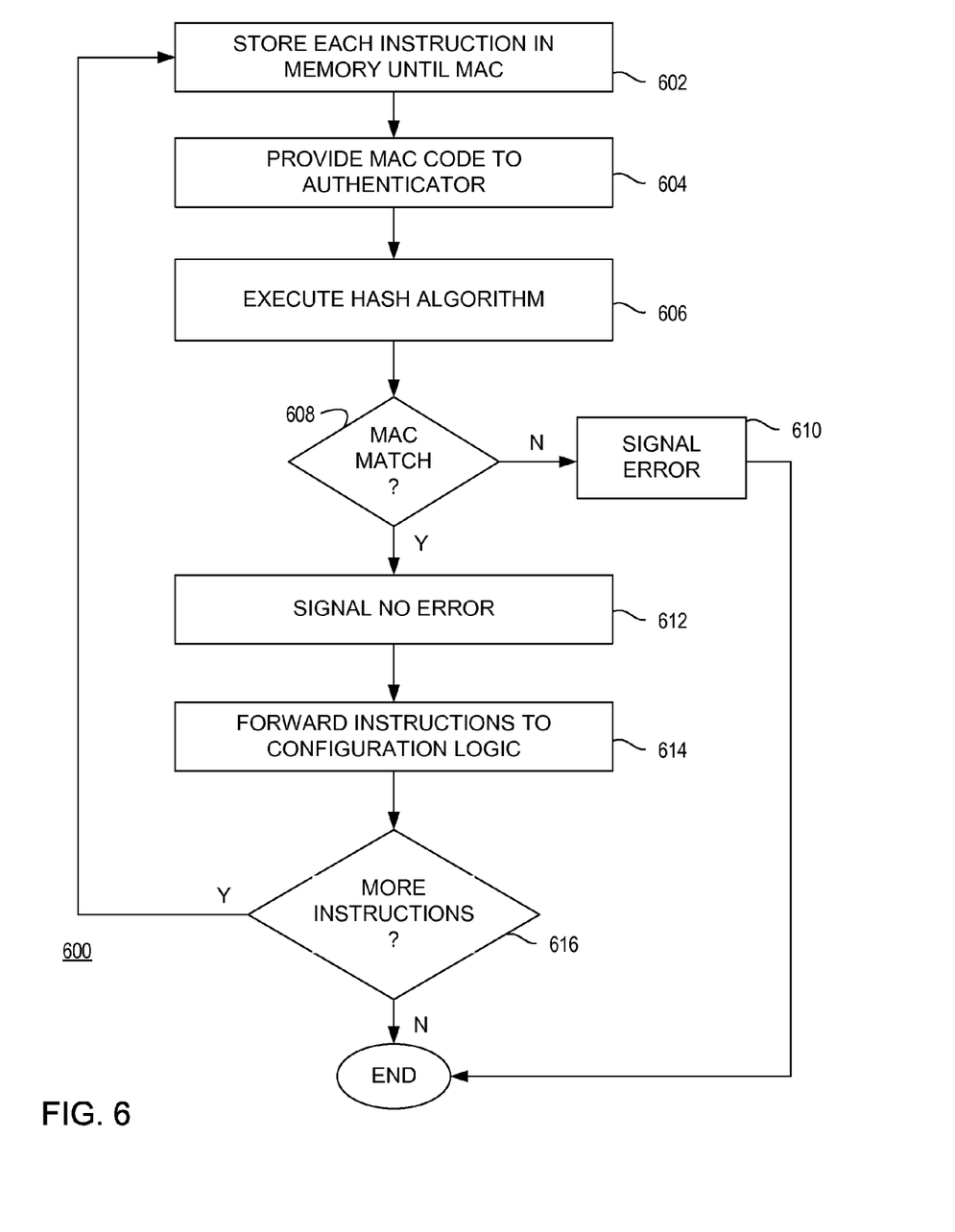
FIG. 6 is a flow diagram depicting a first method of authenticating a bitstream.

FIG. 6 is a flow diagram depicting a method 600 of authenticating a bitstream. The method 600 may be performed by the configuration plane 200 shown in FIG. 2 given the structure 500 for the bitstream. The method 600 begins at step 602, where the controller 214 stores in the memory 212 each instruction occurring in the bitstream until a MAC field is detected. At step 604, the controller 214 provides a MAC code from the MAC field to the authenticator 216. At step 606, the authenticator executes a hash algorithm given the number of words in the calculation (e.g., from a DWC field) and the corresponding instructions and/or configuration data. At step 608, the authenticator 216 determines whether the actual MAC computed using the hash algorithm matches the embedded MAC in the MAC field. If not, the authenticator signals an error to the controller 214. At step 610, the controller 214 stops the configuration process and the method 600 ends.

If at step 608 the authenticator 216 computes an actual MAC that matches the embedded MAC, the authenticator 216 signals no error to the controller 214. At step 612, the controller 214 forwards the instructions to the configuration circuit 208 for execution. At step 614, the controller 214 determines whether the bitstream includes additional instructions and/or configuration data. If so, the method 600 returns to step 602. Otherwise, the method 600 ends. Although the steps of the method 600 are shown sequentially, it is to be understood that some steps may be performed contemporaneously with other steps. For example, while the instructions are being executed at step 612, additional instructions can be stored in the memory at step 602.

Figure 7:
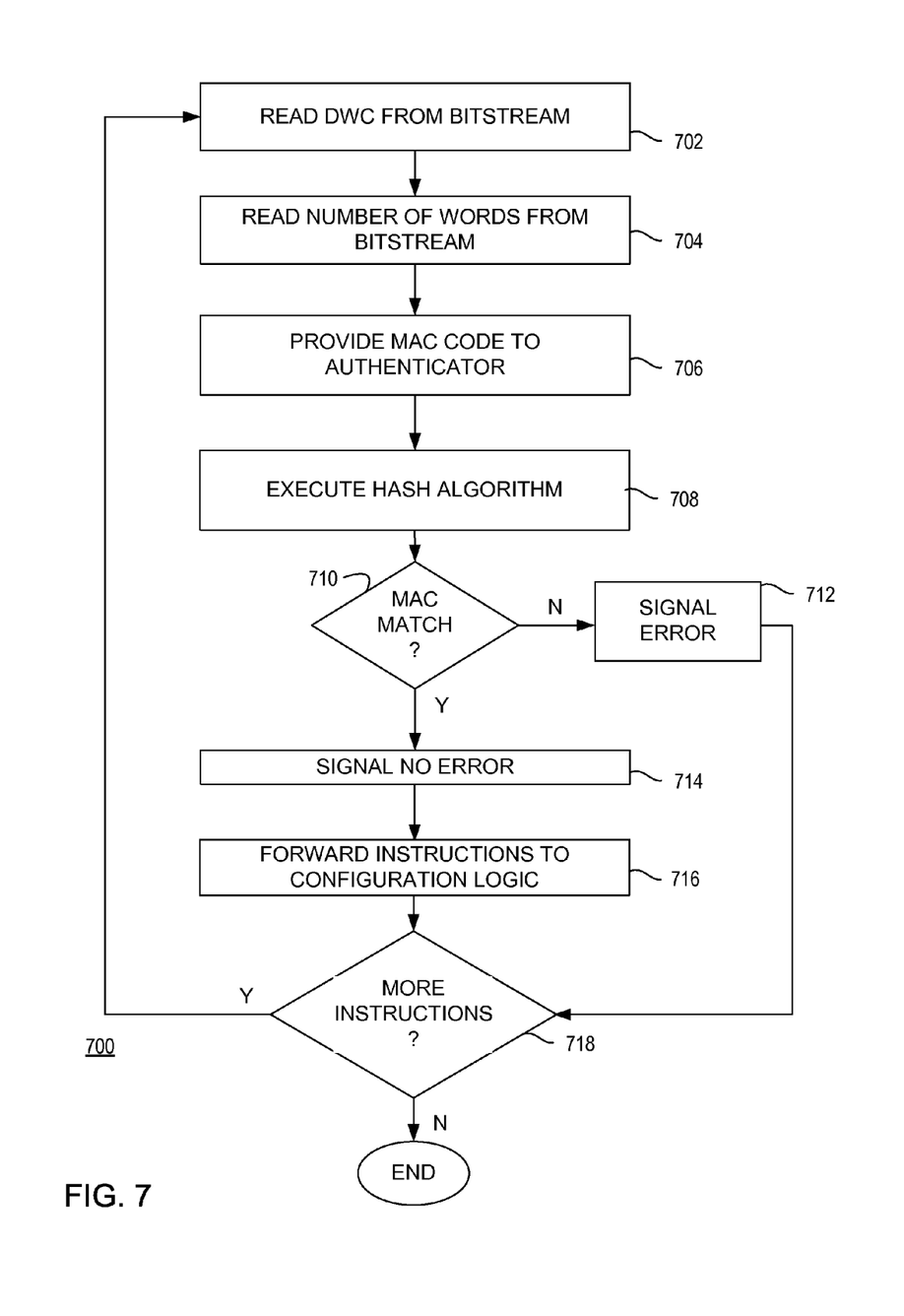
FIG. 7 is a flow diagram depicting a second method of authenticating a bitstream.

FIG. 7 is a flow diagram depicting a method 700 of authenticating a bitstream. The method 700 may be performed by the configuration plane 200 shown in FIG. 2 given the structure 500 for the bitstream. The method 700 begins at step 702, where the controller 214 reads a decrypt word count from a DWC field in the bitstream. At step 704, the controller 214 reads the number of words indicated in the DWC field and stores the resultant instructions in the memory 212. At step 706, the controller 214 provides a MAC code from a subsequent MAC field to the authenticator 216. At step 708, the authenticator executes a hash algorithm given the number of words in the calculation (e.g., from the DWC field) and the corresponding instructions and/or configuration data. At step 710, the authenticator 216 determines whether the actual MAC computed using the hash algorithm matches the embedded MAC in the MAC field. If not, the authenticator signals an error to the controller 214. At step 712, the controller 214 stops the configuration process and the method 700 ends.

If at step 710 the authenticator 216 computes an actual MAC that matches the embedded MAC, the authenticator 216 signals no error to the controller 214. At step 714, the controller 214 forwards the instructions to the configuration circuit 208 for execution. At step 716, the controller 214 determines whether the bitstream includes additional instructions and/or configuration data. If so, the method 700 returns to step 702. Otherwise, the method 700 ends. Although the steps of the method 700 are shown sequentially, it is to be understood that some steps may be performed contemporaneously with other steps. For example, while the instructions are being executed at step 614, additional instructions can be read and stored in the memory at steps 702 and 704.

In the embodiments described above, the bitstream is authenticated using one or more embedded MAC codes and a corresponding hash algorithm. As noted, in case of a single MAC code, one or more unauthorized instructions can be executed before the bitstream is found to be inauthentic. In another embodiment, the configuration plane 200 can stop the configuration process upon detection of an ill-formed instruction. Such detection can be used to combat a "flipped-bit" attack that scrambles one block before flipping the bits in a following block.

For example, the bitstream can be formatted according to the structure 300. As instructions are received in the bitstream, the controller 214 can analyze the instructions to detect an ill-formed instruction. For example, the controller 214 may include a list of valid instructions. If an attacker scrambles bits in the encrypted bitstream to employ a flipped-bit attack, then a decryption of the scrambled bits may result in a set of data that does not result in a valid instruction. Once such an invalid instruction is detected, the controller 214 can stop the configuration process. In this manner, an altered bitstream can be detected before the MAC authentication is performed. The actual probability of successfully detecting an ill-formed instruction is based on the probability that a random pattern of bits will result in an ill-formed instruction given a particular set of bit patterns resulting in valid instructions.

In another embodiment, a parity bit, instruction sequence field or checksum can be added to each instruction in the bitstream. The checksum can be a cyclic redundancy checksum (CRC). For example, a 32-bit CRC value can be added for each instruction, increasing the probability of detecting an ill-formed instruction by $2^{32}$ (two to the 32nd power). Incorporation of a 32-bit CRC for each instruction requires an attacker to try approximately $2^{31}$ changes to the bitstream to get a fake instruction into the bitstream. It is to be understood that more or less CRC bits can be used for each instruction in the bitstream than 32 bits. In some cases, one or more instructions may already include unused bits that can be re-purposed for use as CRC bits, parity or a sequence field.

In another embodiment, a checksum such as a CRC can be added to the bitstream periodically after a predefined number of words. For example, a checksum can be inserted after every four words in the bitstream. The AES encryption standard algorithm decrypts 128-bit blocks. If the checksum check is the first 32-bit instruction in a 4-word block, this will catch an attack before a hacked instruction can execute with probability of $1:2^{32}$. A smaller CRC, for example 24 bits, has the advantage of being smaller and using less memory, but gives a lower probability of detecting a hacked instruction sequence. Since the flipped-bit attack scrambles one block before flipping the bits in the following block, a scrambled block will fail the checksum check before any hacked instruction can execute in the configuration circuit 208. To ensure that the checksum check gets executed, a watchdog counter can be employed to count the number of instructions executed since the last successful CRC (e.g., in the controller 214). Every time the checksum is successful, the timer can be reset. If the counter reaches zero, the controller 214 can stop the configuration process, since a checksum check has not been completed due to an altered bitstream.

In the embodiments described above, the authenticator 216 can perform the checksum checks on the bitstream. The authenticator 216 can inform the controller 214 in case of any failed checksum and the controller 214 can stop the configuration process in case of a failed checksum. Either the authenticator 216 or the controller 214 can implement the watchdog timer in cases where the bitstream includes periodic checksums.

Figure 8:
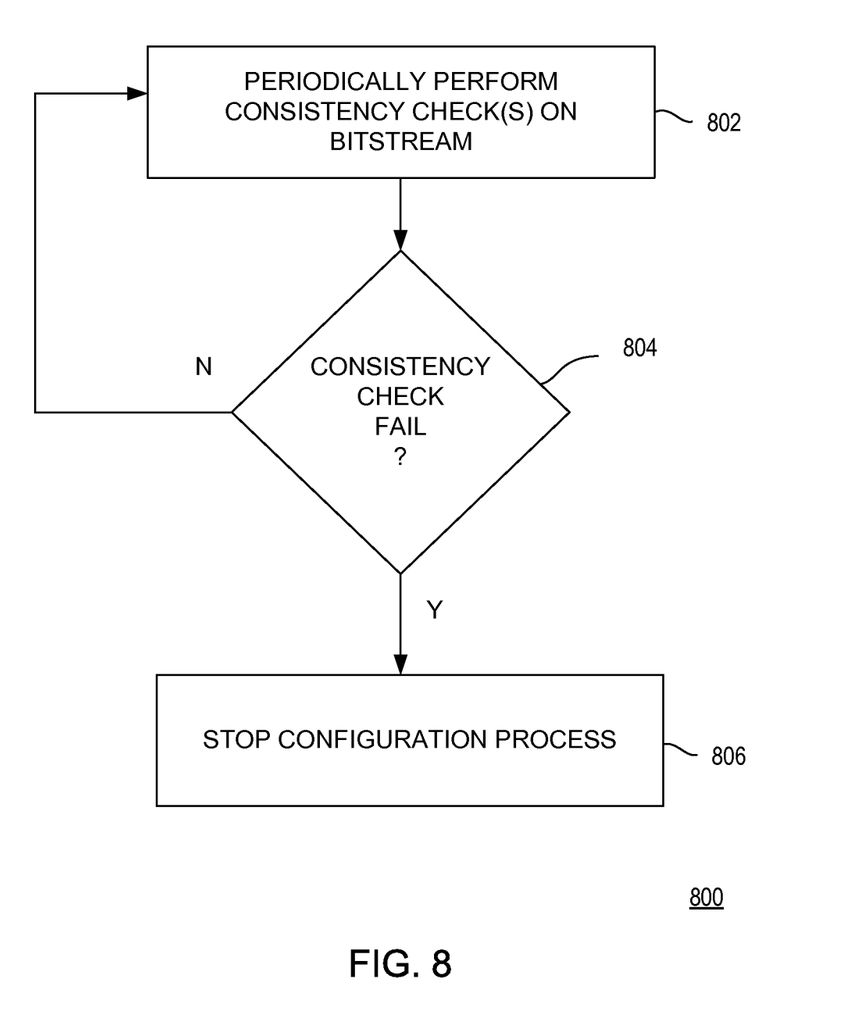
FIG. 8 is a flow diagram depicting a third method of authenticating a bitstream.

FIG. 8 is a flow diagram depicting a method 800 of authenticating a bitstream. Assume a bitstream having a structure similar to the structure 300 is applied to a programmable device having the authentication circuitry 206. At step 802, the authentication circuitry 206 periodically performs at least one consistency check on the bitstream. A consistency check can be a check for an ill-formed instruction, a check of a parity bit, instruction sequence field, or checksum in each instruction, or a check for a checksum occurring periodically in the bitstream (e.g., a CRC check), as described in the embodiments above. The authentication circuitry 206 can perform one or a combination of such consistency checks as the bitstream is processed. At step 804, the authentication circuitry 206 determines whether any consistency check has failed. That is, the authentication circuitry 206 monitors for consistency check failure. If not, the method 800 returns to step 802 and repeats. If a consistency check has failed, the method 800 proceeds to step 806. At step 806, the authentication circuitry 206 signals to stop the configuration process.

While the foregoing describes exemplary embodiments in accordance with one or more aspects of the present invention, other and further embodiments in accordance with the one or more aspects of the present invention may be devised without departing from the scope thereof, which is determined by the claims that follow and equivalents thereof. Claims listing steps do not imply any order of the steps. Trademarks are the property of their respective owners.

What is claimed is:

1. A method of authenticating a bitstream coupled to a programmable device to configure the programmable device, comprising:
   receiving the bitstream via a configuration port of the programmable device, the bitstream including configuration data for programming configuration memory of the programmable device, instructions for programming configuration registers of the programmable device, and at least one embedded message authentication code (MAC);
   storing at least a portion of the instructions received in the bitstream via the configuration port in a memory of the programmable device without programming the configuration registers;
   wherein the instructions include delay-sensitive instructions and delay-insensitive instructions, and the at least a portion of the instructions stored in the memory include only the delay-insensitive instructions;
   forwarding each delay-sensitive instruction to a configuration circuit for execution as such instruction is received in the bitstream at the programmable device;
   in response to receiving in the bitstream, a value that specifies a portion of the bitstream covered by one of the at least one embedded MAC that corresponds to the portion of the instructions, computing, at the programmable device, an actual MAC based on the bitstream using a hash algorithm;
   comparing the actual MAC with the one embedded MAC;
   in response to the actual MAC matching the one embedded MAC, forwarding the portion of the instructions from the memory to the configuration circuit for execution;
   executing each instruction stored in the memory to program the configuration registers; and
   programming the configuration memory with the configuration data from the bitstream based on executed ones of the instructions that program the configuration registers.

2. The method of claim 1, wherein:
the instructions include head instructions and tail instructions;
the bitstream includes configuration data between the head instructions and the tail instructions; and
the at least one embedded MAC includes a first MAC for the head instructions and a second MAC for a combination of the configuration data and the tail instructions.

3. The method of claim 1, wherein the bitstream includes at least one decrypt word count (DWC) that indicates a number of words respectively associated with the at least one embedded MAC.

4. The method of claim 1, further comprising:
decrypting at least a portion of the bitstream upon receipt from the configuration port.

5. The method of claim 4, wherein the at least a portion of the bitstream is decrypted using a shared symmetric key.

6. A method of authenticating a bitstream coupled to a programmable device to configure the programmable device, comprising:
receiving the bitstream via a configuration port of the programmable device, the bitstream including instructions for programming configuration registers of the programmable device and configuration data for programming configuration memory of the programmable device;
storing at least a portion of the instructions received in the bitstream via the configuration port in a memory of the programmable device without programming the configuration registers;
wherein the instructions include delay-sensitive instructions and delay-insensitive instructions, and the at least a portion of the instructions stored in the memory include only the delay-insensitive instructions;
forwarding each delay-sensitive instruction to a configuration circuit for execution as such instruction is received in the bitstream at the programmable device;
performing at least one consistency check on the bitstream periodically, wherein the performing includes:
analyzing each of the instructions as received in the bitstream to detect an ill-formed instruction by comparing each instruction against a plurality of valid instructions; and
indicating consistency check failure if any one of the instructions is detected as an ill-formed instruction;
executing each of the instructions stored in the memory to program the configuration registers until any one of the at least one consistency check fails, after which any remaining instructions in the bitstream are not executed; and
programming the configuration memory with the configuration data from the bitstream based on executed ones of the instructions that program the configuration registers.

7. The method of claim 6, wherein:
each of the instructions includes a corresponding checksum; and
the performing includes:
processing the checksum for each of the instructions; and
indicating consistency check failure if the checksum of any one of the instructions fails.

8. The method of claim 7, wherein:
the bitstream includes a plurality of checksums occurring periodically throughout; and
the performing includes:
initializing a timer that counts down towards zero to a predefined value;
validating each checksum as each of the plurality of checksums is received;
re-initializing the timer to the predefined value after each valid checksum; and
indicating consistency check failure if the timer reaches zero.

9. The method of claim 6, wherein:
the bitstream includes a plurality of checksums occurring periodically throughout; and
the performing includes:
initializing a timer that counts down towards zero to a predefined value;
validating each checksum as each of the plurality of checksums is received;
re-initializing the timer to the predefined value after each valid checksum; and
indicating consistency check failure if the timer reaches zero.

10. The method of claim 6, wherein the bitstream includes a message authentication code (MAC) computed with respect to all of the instructions.

11. An apparatus for authenticating a bitstream coupled to a programmable device to configure the programmable device, comprising:
a memory;
a controller coupled to the memory;
wherein the controller is configured to:
receive the bitstream via a configuration port of the programmable device, the bitstream including configuration data for programming configuration memory of the programmable device, instructions for programming configuration registers of the programmable device, and at least one embedded message authentication code (MAC); and
store at least a portion of the instructions received in the bitstream in a memory of the programmable device without programming the configuration registers;
wherein the instructions include delay-sensitive instructions and delay-insensitive instructions, and the at least a portion of the instructions stored in the memory include only the delay-insensitive instructions; and
wherein the controller is configured to provide each delay-sensitive instruction for execution to a configuration circuit for execution as such instruction is received in the bitstream at the programmable device; and
an authenticator coupled to the controller;
wherein the authenticator is configured to:
compute, at the programmable device in response to receiving a value that specifies a portion of the bitstream covered by one of the at least one embedded MAC that corresponds to the portion of the instructions, an actual MAC based on the bitstream using a hash algorithm; and
compare the actual MAC with the one embedded MAC;
wherein the controller is configured to:
provide, in response to the actual MAC matching the one embedded MAC, each instruction stored in the memory for execution to program the configuration registers; and
provide the configuration data from the bitstream to the configuration circuit for programming the configuration memory based on executed ones of the instructions that program the configuration registers.

12. The apparatus of claim 11, wherein:

the instructions include head instructions and tail instructions;

the bitstream includes configuration data between the head instructions and the tail instructions; and the at least one embedded MAC includes a first MAC for the head instructions and a second MAC for a combination of the configuration data and the tail instructions.

13. The apparatus of claim 11, wherein the bitstream includes at least one decrypt word count (DWC) that indicates a number of words respectively associated with the at least one embedded MAC.

14. The apparatus of claim 11, further comprising a decryptor coupled to the controller, wherein the decryptor is configured to decrypt at least a portion of the bitstream upon receipt from the configuration port.

* * * * *